United States Patent [19]

Hayashi et al.

[11] Patent Number: 4,599,177

[45] Date of Patent: Jul. 8, 1986

[54] PROCESS FOR REMOVAL OF MERCURY FROM WASTE WATER

[75] Inventors: Saburo Hayashi; Mitsukazu Mukai, both of Kakogawa; Masahiro Inoue, Hyogo; Hiroo Tsuchiya, Kakogawa; Akira Otsuji, Hyogo; Takeo Tanabe, Nara, all of Japan

[73] Assignee: Seitetsu Kagaku Co., Ltd., Miyanishi, Japan

[21] Appl. No.: 597,237

[22] Filed: Apr. 4, 1984

Related U.S. Application Data

[63] Continuation-in-part of Ser. No. 502,972, Jun. 10, 1983, abandoned.

[30] Foreign Application Priority Data

Jun. 22, 1982 [JP] Japan ................................ 57-108194
Jun. 22, 1982 [JP] Japan ................................ 57-108195
Jun. 22, 1982 [JP] Japan ................................ 57-108196

[51] Int. Cl.$^4$ ............................................. C02F 1/62
[52] U.S. Cl. .................................... 210/718; 210/719; 210/757; 210/914
[58] Field of Search ............... 210/914, 719, 718, 721, 210/724, 726, 737, 750, 757, 760, 763

[56] References Cited

U.S. PATENT DOCUMENTS 3,764,528 10/1973 Cadmus ........................... 210/914 X
3,847,598 11/1974 Coulter et al. .................. 210/914 X
3,857,704 12/1974 Coulter ........................... 210/914 X

*Primary Examiner*—Thomas Wyse
*Attorney, Agent, or Firm*—Bucknam and Archer

[57] ABSTRACT

A process for the removal and recovery of mercury and, if desired, other heavy metals from incinerator waste water produced by washing waste gases from incinerators, which comprises adding to the waste water a reducing agent or a combination of oxidizing and reducing agents, subjecting the thus added waste water to stripping treatment in the presence of ferrous ion to obtain a mercury vapor-containing gas and simultaneously form spinel type crystalline compounds and then cooling said gas to separate and recover the mercury. If desired, said spinel type crystalline compounds are also removed from the mercury-free waste water.

15 Claims, No Drawings

PROCESS FOR REMOVAL OF MERCURY FROM WASTE WATER

CROSS-REFERENCE TO RELATED APPLICATION

This application is a continuation-in-part of Ser. No. 502,972, filed June 10, 1983 and now abandoned.

BACKGROUND OF THE INVENTION

1. Field of the Invention

This invention relates to a process for the removal and recovery of mercury and, if desired, other heavy metals from waste water containing such heavy metals and more particularly to such a process which comprises treating such waste water, particularly waste water produced by washing waste gases from an incinerator (such waste water being hereinafter referred to as "incinerator waste water" for brevity), with a reducing agent and then subjecting the thus treated waste water to stripping treatment in the presence of ferrous ion to obtain gases containing gaseous mercury, cooling the thus obtained gases to separate the mercury therefrom and, if necessary, further treating impurities such as the other heavy metals remaining in the resulting residue to separate them therefrom.

2. Description of the Prior Art

Combustion or waste gases from incinerators and particularly from municipal refuse incinerators contain a variety of harmful substances. It is accordingly the general practice to discharge the waste gases in the air after washing thereof, however, this practice raises a problem as to treatment of the resulting washings or waste water.

For instance, when municipal refuse including, in addition to ordinary refuse, rubbers, plastics and other combustible matters is incinerated, there will frequently be produced waste gases containing, apart from carbonic acid gas and water vapor, powders of harmful metal salts as well as harmful gases such as sulfur oxides, nitrogen oxides, chlorine and hydrogen chloride. Further, mercury which is ordinarily contained in cells and fluorescent lamps will be chemically combined with the above-mentioned hydrogen chloride and/or sulfur oxides during the incineration to give mercury-reacted chloride and/or sulfur oxides, or it will be reacted with organic matters which are not fully oxidized or decomposed, during the incineration to give organomercury compounds or complexes thereof. Thus, the waste gases may further contain such mercury-reacted compounds, organomercury compounds or complexes thereof. When the waste gases from the incinerator are treated with a cleaning liquid such as water or an alkaline solution, they will be cleaned or purified, however, a difficulty will be encountered in rendering harmless the used cleaning liquid in which the harmful substances are absorbed. It is relatively easy to convert the sulfur oxides and hydrochlorides in neutralized form contained in the waste cleaning liquid into harmless materials by chemical or physical means in order to separate and recover the resulting harmless materials from the waste cleaning liquid or in order to dilute and discharge the waste cleaning liquid. However, it has been prohibited by regulations to discharge waste water containing harmful heavy metal compounds, even in very low concentrations, to seas or rivers. Accordingly, it has been a very difficult problem to separate and recover harmful heavy metals from such waste water thereby rendering the waste water harmless.

A number of processes have been hitherto proposed for fixing and separating heavy metals such as mercury from waste water containing the heavy metals, particularly mercury. However, in order to carry out these processes on an industrial scale, there remain a number of problems to solve. Thus, there have not been known satisfactory processes for the removal of heavy metals from waste water containing the same.

For instance, quantitive determination of total mercury is carried out by an analytical method comprising adding large amounts of highly concentrated sulfuric and nitric acid to a mercury-containing waste water sample, boiling the resulting mixture, adding a reducing agent to the thus boiled mixture to strip it of the mercury using air and then determining the amount of mercury so stripped by the atomic absorption spectroscopy. However, it is difficult from the viewpoint of corrosion resistance and cost of apparatus to make use of this method for treatment of a variety of waste waters on an industrial scale.

In known literature, there is the statement that mercury compounds are susceptible to reduction with reducing agents. However, it is not particularly described to what extent or at what level the mercury compounds are reduced to strip the mercury therefrom. Moreover, it is not stated at all that such a high recovery percentage as described hereinafter is attained and waste water can be treated to such an extent that the residual mercury concentration is as low as 0.005 mg/l or less.

So far as mere removal of mercury from waste water is concerned, several techniques of treating waste water are known including a sulfide precipitation and separation technique, an alkali precipitation and separation technique and the like. In these techniques, mercury is not recovered and is discharged into the natural world in the form of a sludge, thus polluting the natural world and increasing environmental burden. In addition, the treated water has a mercury concentration as high as 0.1–0.01 mg/l and it is difficult to lower the mercury concentration to a level below 0.005 mg/l prescribed in the legal requirements in Japan. Especially, it is very difficult to apply the above-mentioned processes to the treatment of waste water which is obtained by washing waste gases from municipal refuse incinerators. For instance, the former process in which the mercury in the waste water is fixed with hydrogen sulfide as mercury sulfide and then separated from the waste water, and the latter process in which the mercury in the waste water is treated with an alkali for precipitation and separation as mercury hydroxide (which is readily converted into oxide). These processes are both suitably applied only to a case where mercury is present as ions, however, non-ionized organic mercury compounds or complexes remain as they are without causing reactions, if any in the waste water. Moreover, the sulfides or oxides tend to form fine particles and it is very difficult to precipitate and separate them from a concentrated salt solution having a concentration of about 10–15% because of a small difference in specific gravity between the particles and salt solution. This leads to a tendency that the fine particles are carried over from a separator, with the result that they remain in the waste water and thus cannot be removed. Accordingly, these processes are not suitable for economical treatment in which the waste water is concentrated to have a high concentration of mercury salts and reduce the amount of the waste water being treated. It has been confirmed that when the precipitate obtained by these processes is separated from the treated water and discharged into the natural world, the mercury compounds contained therein will be converted into harmful methylmercury compounds by bacteria in the soil. Thus the precipitate cannot be discharged in this form.

As is apparent from the above, heavy metals and particularly mercury cannot completely be removed by these known processes. Even when the mercury components are separated and discharged into the natural world, they will cause environmental pollution because of conversion into harmful substances such as methylmercury compounds. Thus, these processes are not advantageous.

In the treatment of mercury which apparently has an adverse influence on human bodies, there should not be used a process comprising discharging mercury into the natural world basically accompanied by pollution thereof but a process should be used comprising recovering the mercury from the waste water for reutilization.

The present invention is accomplished on the basis of the above standpoint and has for its object the provision of a process which comprises effectively removing and recovering mercury and, if desired, other heavy metals from incinerator waste water containing such metals thereby rendering it harmless.

The present inventors have already found that when $NO_3^-$ is caused to be present in waste water obtained by washing waste gases from an incinerator, concentrations of heavy metals in the waste water are increased, and the waste water is held at high temperatures and suitable neutral to alkaline pH values, the velocity of a spinel-forming reaction can be increased with an attendant remarkable reduction of treating time. It was considered that these conditions could be conveniently applied to the washing treatment of waste gases from incinerators and it was confirmed that the above treatment could effectively be carried out on an industrial manner. We thus filed a Japanese Patent Application No. 157794/81 (Japanese Pat. Appln. Laid-Open No. 174190/82), entitled "PROCESS FOR THE TREATMENT OF WASTE WATER OBTAINED BY WASHING WASTE GASES FROM INCINERATORS". The subject matter of the thus filed application resides in a process for the treatment of waste water obtained by washing waste gases from an incinerator, which comprises the steps of charging waste gases from an incinerator into a scrubber to which water or an alkaline aqueous solution is fed as the cleaning liquid thereby washing the waste gases therewith, contacting part or all of the cleaning liquid with the high temperature waste gases prior to the introduction thereof into the scrubber, adding 0.002 mol/l to 1.0 mol/l of $NO_3^-$ and 0.01 to 2.0 mols/l of $Fe^{++}$ to the cleaning liquid after the gas-liquid contact, neutralizing the thus added cleaning liquid with caustic alkali, subjecting the thus neutralized liquid to oxidation treatment while keeping the pH at 6.5 to 11.5 and the temperature at 50° C. or higher thereby producing a spinel type crystal compound (hereinafter called "spinel compound"), and separating the product from the neutralized cleaning liquid.

During the course of carrying out the above process, we have found that when air is blown into the used cleaning liquid, that is a waste liquid, for the oxidation reaction, most of the mercury contained in the cleaning liquid is entrained with the air in the form of vapor. Extensive studies were made on a number of reducing and oxidizing agents to find suitable time of adding the agents, amount of the agents and reaction conditions for facilitation of the entrainment. As a result, there was found a process of positively recovering mercury and, if necessary, the other heavy metals from waste water and rendering the waste water harmless. The present invention is accomplished on the basis of the above finding.

SUMMARY OF THE INVENTION

According to the present invention, there is provided a process for the removal and recovery of mercury from incinerator waste water containing mercury and other heavy metals, comprising adding to the waste water a member selected from the group consisting of a reducing agent and a combination of oxidizing and reducing agents for the treatment of the waste water, subjecting the thus added waste water to stripping treatment at a temperature of not lower than 15° C. in the presence of ferrous ion to obtain a gas mixture containing mercury vapor and cooling the gas mixture to separate the mercury therefrom while rendering the residual waste water harmless.

DETAILED DESCRIPTION

In various industrial waste waters including waste water obtained by washing the boilers in municipal refuse incinerators, miscellaneous waste waters such as waste water from regeneration of ion-exchange resins, waste water from ashpit, incinerator waste water such as waste water obtained by washing waste gases from municipal refuse incinerators, mercury is dissolved in various compound forms such as mercurous chloride, mercuric chloride, mercury sulfide, mercurous nitrate, mercuric oxide, organomercury compounds and complexes thereof. This is because, as described hereinabove the mercury contained in refuse or industrial waste will be chemically combined with hydrogen chloride, sulfur oxides, nitrogen oxides, undecomposed organic matters and the like at the time of combustion in incinerators thereby forming various mercury compounds. According to the process of the invention, when a reducing agent such as, for example, ferrous ions is added to the mercury-containing waste water, part of these mercury compounds is reduced to metallic mercury. When the waste water is stripped of the mercury using a gas (air in an ordinary case), the metallic mercury so stripped will be transferred into the gas phase.

Ease in the conversion of the mercury compounds in the waste water into metallic mercury and also in stripping of the resulting metallic mercury as discussed above depends on the form of the mercury (the type of the mercury compound) being treated. All the forms of mercury and all the types of the mercury compounds are not readily driven off or expelled by stripping. Although some of mercury compounds may readily be stripped off only by blowing of air, most of them have to be treated with reducing agents or combinations of reducing and oxidizing agents, followed by efficiently stripping and recovering the mercury under optimum conditions which depend on the type of the additive or additives used. For instance, when ferrous ions are used, it is necessary that $Fe^{++}$ be present in an amount of 0.01 to 2 mols/; and that the stripping be effected at temperatures not lower than 15° C. Ferrous ions are usually added in the form of ferrous sulfate or ferrous chloride as powder or an aqueous solution. From the standpoint of handling and economy, ferrous sulfate is preferred. The amount thereof may vary depending on the form and amount of mercury in the waste water and is generally in the range of 0.01 to 2 mols/l, calculated as $Fe^{++}$. Smaller amounts give little effect whereas larger amounts are unfavorable because no further effect of addition can be expected. In this connection, better results are obtained by preliminarily adding a reducing agent to the waste water to sufficiently reduce the mercury compounds to metallic mercury if they are susceptible to reduction or by firstly decomposing the mercury compounds with an oxidizing agent and then reducing the thus decomposed compounds with a reducing agent if the original mercury compound are difficult to reduce. Anyway, it is preferred that the mercury compounds in the waste water be completely reduced into metallic mercury and then subjected to stripping treatment.

Reducing agents which are preliminarily or directly added for the reduction treatment in the practice of the invention include, for example, ferrous ion, hydrazine, sodium borohydride, hydroxylamine hydrochloride, sodium sulfite, sodium dithionite. Powders of metals such as iron, zinc, magnesium, tin and aluminium may also be used. It is important to properly used these reducing agents depending on the nature of waste water. Especially when the waste water is acidic, metal powders are effectively used. On the contrary, in case where the waste water is alkaline in nature, all the reducing agents mentioned above can be used. In general, the type of reducing agent should be determined depending on the content of mercury in the waste water and the pH thereof. As a matter of course, it is possible to appropriately adjust the pH of the waste water in order to use an intended reducing agent. In some cases, better results are obtained by using two or more reducing agents in combination. The amount of reducing agents depends on the content of mercury in the waste water, the type of mercury compound and the pH of the waste water. In general, it is necessary to add a reducing agent in amounts of more than an equivalent of the mercury contained. Attention should be paid to the fact that even if the amount is too large, further effects of addition cannot be expected.

As described before, some types of mercury compounds in waste water hardly undergo reduction. In this case, such compounds are first decomposed with oxidizing agents and then subjected to reduction. Examples of the oxidizing agents useful for the purpose of the invention include hypochlorites, potassium permanganate, potassium bichromate, hydrogen peroxide, persulfates, chlorites, and oxidative gases such as air, oxygen and ozone. The solid or liquid oxidizing agents can be added as they are or in the form of an aqueous solution. The gaseous oxidizing agents are used by blowing them into waste water as they are. Better results may be obtained by using two or more of these oxidizing agents in combination. The amount of oxidizing agents used is dependent on the content of mercury in the waste water, the type of mercury compound therein and the pH of the waste water. Similar to reducing agents, it is necessary to add oxidizing agents in amounts of more than an equivalent of the mercury contained.

The oxidation may be effected while irradiating the waste water with ultraviolet rays from a high pressure mercury lamp in order to improve the oxidizing effect. When the decomposition with reducing agents or combinations of oxidizing and reducing agents is effected while heating to temperatures not lower than 15° C., preferably not lower than 50° C., the mercury compounds will readily completely be decomposed into metallic mercury.

The time at which the reducing or oxidizing agents are added is not critical. Where the reducing agent alone is added, it may be preliminarily added to the waste water or may be added during stripping of the waste water.

In a case where both the oxidizing and reducing agents are added, the oxidizing agent is first added to the waste water thereby to decompose the mercury compounds. Addition of the reducing agent may be either prior to, or during, stripping in a manner similar to the above case where the reducing agent is used singly. The stripping treatment may be carried out while adding the oxidizing and reducing agents at the same time. In this case, the oxidizing and reducing agents which do not directly react with each other must be used.

Where a stripping gas used is air, it also serves as an oxidizing agent, so that any additional oxidizing agent may not necessarily be needed. With certain types of the reducing agents, consideration should be given as to whether or not they react directly with the oxygen in air.

The waste water referred to herein is often neutral to acidic in nature as in the case of waste water obtained by washing waste gases from incinerators. The waste water may be subjected to stripping as it is, depending on the form and amount of mercury in the waste water. Better results are obtained by rendering the waste water weakly acidic or alkaline by adjustment of pH to 4 or higher, preferably 6 or higher. The adjustment is effected by adding a suitable amount of caustic alkalis, ordinarily caustic soda. According to the process of the invention, the stripping treatment is effected at temperatures not lower than 10° C., preferably not lower than room temperature and more preferably not lower than 50° C. Higher temperatures frequently lead to better results. In this connection, however, suitable temperatures should be selected from the industrial standpoint because of the problem involved with regard to apparatus. In some cases, it is preferable to use an inert gas such as nitrogen for stripping. In general, it is sufficient to blow air into the waste water using a blower, thereby attaining an adequate effect.

Although it is possible to strip the waste water of the mercury by means of steam under a reduced pressure, it is convenient to use a molecular oxygen-containing gas such as air because such a stripping gas can be used as it is for a subsequent spinel-forming reaction. In this manner, the mercury in the waste water is stripped and transferred into the stripping gas. The resulting gas mixture is then cooled whereupon the mercury vapor is liquefied and separated. The cooling will become more effective when effected at lower temperatures. It is preferable to cool the gas mixture at temperatures of up to 10° C. using chilled water. The cooling is generally effected by an indirect cooling technique in which the gas mixture is introduced into a heat-exchanger of any known type but in some cases, cooling by direct contact with cooling water may be convenient for recovering liquid mercury. Alternatively, the gas mixture may be cooled to temperatures of not higher than 0° C. and the mercury contained therein may be separated by the use of a "freezing and re-melting" technique. Moreover, in order to further recover the mercury vapor remaining in the separated gas phase, the cooled gas is brought into contact with a commercially available adsorbent resin (e.g. Nisso ALM-125, Nippon Soda Co., Ltd.) and the mercury vapor is recovered by adsorption. Alternatively, the remaining mercury vapor may be recovered by absorption in an oxidizing agent such as sodium hypochlorite or magnesium permanganate or it may be collected as an amalgam using a noble metal such as gold or silver. These recovery techniques are, of course, within the scope of the invention.

Incinerator waste water to be treated according to the present invention may, in some cases, include mercury-containing compounds, such as non-ionized organic mercury and complex mercury, which cannot be converted to metallic mercury only by the addition of a reducing agent to them. The incinerator waste water may usually further include other various heavy metals such as cadmium, chromium, iron, lead, zinc and manganese. It is noted in the present invention that mercury is normally in the form of a low-boiling liquid unlike other heavy metals in attempts to not only effectively remove and recover mercury from the waste water but also treat the other heavy metals so that they are made harmless. Taking advantage of the said feature of mercury, mercury compounds in the waste water are reduced and then volatilized to transfer the resulting mercury to the resulting gas phase thereby separating the mercury from the other heavy metals for recovery of the mercury, while the other heavy metals are treated in the presence of ferrous ion to convert them to stable spinel-type crystalline compounds for rendering them harmless.

In this case, in general, the waste water after the stripping treatment may be further treated by neutralizing it with a caustic alkali in the presence of 0.002 to 1.0 mol/l of $NO_3^-$ ion and then keeping the alkali-added waste water at a pH of 6.5 to 11.5 and, if necessary, at temperatures of at least 50° C. thereby further stabilizing the spinel compounds produced by the reaction with ferrous ion, followed by separating the compounds. In some cases, it is possible to produce and separate stable spinel compounds efficiently without the use of $NO_3^-$ ion. If concentrations of salts in the incinerator waste water are suitably controlled, it will become possible to have $NO_3^-$ contained in amounts within the range indicated above by adding a nitrate such as sodium nitrate. In contrast, if $NO_3^-$ is contained in the waste water, its concentration is controlled such as by concentration to be within the above-indicated range. If the waste water is acidic, it is neutralized with a caustic alkali such as caustic soda, caustic potash or the like and the pH is kept at 6.5 to 11.5. Subsequently, a molecular oxygen-containing gas is blown into the waste water for oxidation while keeping the waste water at temperatures at 50° C. or higher, if necessary, thereby forming spinel compounds as a precipitate. The precipitate is separated as usual. The reaction conditions should suitably be determined depending on the types of harmful substances including heavy metals other than mercury, such as cadmium, chromium, cobalt, tin, lead, nickel, manganese, zinc and copper as well as arsenic. As a matter of course, $Fe^{++}$ which has been used for the removal of mercury can be utilized as it is for the spinel-forming reaction. When the amount of $Fe^{++}$ is small, it is necessary to add a ferrous salt such as ferrous sulfate or ferrous chloride. The stripping treatment for recovering mercury may serve as a pretreatment for the spinel formation and permit the degree of the subsequent oxidation to be lessened. In the first step of the present process, the waste water is incorporated either with only a reducing agent or with an oxidizing agent for decomposition of the mercury compounds in the waste water and then with a reducing agent, to convert the mercury compounds to elemental mercury which is liable to be volatilized. In the second step thereof, the thus treated waste water containing the elemental mercury is subjected to stripping treatment in the presence of ferrous ion by blowing air or the like into the waste water. The ferrous ion is effective in enabling the mercury compounds which were little or not convertible to elemental mercury in the first step, to be converted to elemental mercury for volatilization and is simultaneously also effective in converting the other various heavy metals in the waste water to water-insoluble spinel-type crystalline compounds which occlude therein a minute amount of sparingly decomposable and volatilizable mercury compounds still remaining in the waste water for stabilization of these compounds. Ferrous ion acts as an ordinary reducing agent on mercury compounds and has capability of forming spinel-type crystalline compounds. Depending on the kinds and amounts of mercury compounds contained in the waste water, it will need only ferrous ion without using other reducing agents in combination to reduce the mercury compounds for volatilization of the resulting elemental mercury and simultaneously form spinel-type crystalline compounds. There are practically no such conspicuously effective reducing agents other than ferrous ion.

It is more effective to add the general reducing agents and ferrous ion continuously to the waste water for batchwise treatment thereof or add them in several portions to the waste water for continuous treatment thereof than to add all of them at one time to the waste water, and, further, said addition in continuous manner or in several portions permits the general reducing agents or ferrous ion to be used in less amounts, these being also among the features of the present invention. In this manner, the process of the removal and recovery of mercury from the waste water according to the invention and the treatment of heavy metals for rendering them harmless, may be carried out in combination with higher efficiency and economy in many cases. In this manner, harmful heavy metals such as chromium, cobalt, nickel, lead, zinc, arsenic, silver, cadmium and tin which are contained in various kinds of waste water can all be transferred into spinel compounds in the form of a water-insoluble precipitate which is then removed thereby to reduce the mercury content to less than 0.05 mg/l. In the practice of the invention, even though other various salts are present in the waste water, they do not substantially impede the spinel-forming reaction but serve to extend the operation range thereby enabling one to carry out the process of the invention on an industrial scale.

The thus formed precipitate of spinel compounds is separated from the water by filtration or centrifugal separation and can effectively be utilized as a radio trouble inhibiting material or a filling-up material.

The waste water from which the precipitate of spinel compounds has been separated is harmless and can usually be discharged as it is. If it is necessary to further reduce the amount of mercury contained therein, the waste water after the separation may further be admixed with a reducing agent and subjected to stripping treatment. Alternatively, the waste water may be admixed with an oxidizing agent and then with a reducing agent, and subjected to stripping treatment. As a result, the mercury remaining in the waste water can completely be separated and recovered. The reducing agents used for this purpose include, for example, hydrazine, sodium borohydride, hydroxylamine hydrochloride, sodium sulfite, sodium dithionite and the like. Metal powders may also be used. Likewise, the oxidizing agents include, for example, hypochlorites, hydrogen peroxide, persulfates, chlorites, air, oxygen, ozone and the like. Although potassium permanganate and potassium bichromate may be used, care should be taken because such compounds contain heavy metals and thus may be unfavorable in some cases. The stripped gas mixture containing mercury vapor may be cooled singly or in combination with the previously stripped gas mixture thereby separating and recovering the mercury therefrom.

The above-described after-treatment process in which the waste water from which the precipitate has been separated is further admixed with a reducing agent or oxidizing and reducing agents and subjected to stripping treatment thereby removing and recovering the mercury therefrom, can be applied not only to the treated liquor from which produced spinel compounds have been separated as illustrated before, but also to the waste water prior to the spinel formation reaction but after the stripping treatment using a reducing agent such as hydrazine, sodium borohydride, hydroxylamine hydrochloride, sodium sulfite or sodium dithionite. By this process, the mercury can be removed to a level of 0.0001 ppm and thus it may be said that the waste water after the after-treatment is completely harmless.

The thus obtained harmless neutralized solution or waste water may be discharged as it is or after dilution. Alternatively, the salts dissolved in the harmless waste water may be precipitated and separated for use as industrial materials.

The process of the present invention can be applied to various liquors such as filtrates obtained by treating mercury-containing waste water by a neutralization precipitation process, a sodium sulfide process, electrolytic coagulation process, an iron powder addition process or the like, and filtrates obtained by subjecting the above-mentioned filtrates further to adsorption treatment with chelate resins. The portion of mercury which has not been removed by these processes can be substantially completely removed by the process of the invention to a level of 0.1 ppb or less.

In this manner, the mercury in the waste water can almost completely be stripped and recovered in a high yield. Not only the recovered mercury can effectively be utilized, but also the waste water from which the mercury has almost completely be removed is harmless, thus the process of the invention having a great industrial merit.

The present invention is more particularly described by way of examples.

EXAMPLES 1-3

Various kinds of waste water produced by washing waste gases from municipal refuse incinerators at various districts were subjected to a test for stripping and recovering the mercury contained in the waste water using an air blowing technique. The waste water of one of the various kinds comprised, in mixture, 100 kg of waste water obtained by washing of a boiler, 200 kg of waste water obtained by regeneration of an ion-exchange resin, 50 kg of waste water from ashpit and 1,005 kg of waste water produced by washing gases from an incinerator and had a salt concentration of 15%.

Prior to stripping the waste water of the mercury, each waste water was subjected to decomposition by reduction or decomposition by oxidation and reduction. The decomposition was effected by heating the waste water to 70 to 90° C. while changing the pH of the water by the use of additives. An experiment was carried out using a gas blowing tube equipped with a sintered glass and a 2-liter four neck distillation flask equipped with an agitator, into which 1 kg of each sample was charged and heated on an oil bath. Stripping of the mercury was conducted under conditions of a sample temperature of 70° C., a pH of 11 (adjusted with NaOH), an amount of blowing air of 1 ? /min and an amount of the sample of 1 kg. Gases from the outlet of the reactor, that is the flask, were introduced into a gas absorption bottle equipped with a condenser in which the mercury in the gases was absorbed in a sulfuric acid-potassium permanganate solution. This mercury-absorbed solution was measured for its mercury concentration by the atomic absorption spectroscopy. The amount of mercury stripped was deemed as the amount of mercury recovered. The treating conditions and results are shown in Table 1.

In Examples 1 and 2, the waste water to be treated contained other various heavy metals in addition to mercury as shown in Table 2 although Table 1 indicates only the recovery ratios of mercury obtained by the addition of $FeSO_4$. These other heavy metals were reacted with $FeSO_4$ to form spinel compounds while reducing the mercury compounds with $FeSO_4$ and volatilizing the resulting mercury. The waste water so far treated was filtered to remove the spinel compounds thereby obtaining a filtrate which contained substantially Table 2.

TABLE 1

| Ex. No. | Waste Water | | | Oxidation Conditions | | Reduction Conditions | | Recovery* of Mercury % |
|---|---|---|---|---|---|---|---|---|
| | Kind | Salt Conc. % | Hg Conc. ppm | Amount of Oxidizing Agent added mg | pH | Amount of Reducing Agent added mg | pH | |
| 1 | B | 15 | 10 | — | | $FeSO_4$ 12000 | 10 | 93.0 |
| 2 | C | 10 | 2 | $O_3$ 120 | 11 | $FeSO_4$ 12000 | 10 | 98.5 |

TABLE 1-continued

| | Waste Water | | | Oxidation Conditions | | Reduction Conditions | | Recovery* of Mercury % |
|---|---|---|---|---|---|---|---|---|
| Ex. No. | Kind | Salt Conc. % | Hg Conc. ppm | Amount of Oxidizing Agent added mg | pH | Amount of Reducing Agent added mg | pH | |
| 3 | C | 10 | 2 | $O_2$ 60 | 11 | $FeSO_4$ 12000 | 10 | 90.0 |

Note
1: Amounts of oxidizing and reducing agents in the table indicate those of the agents in the pure form.
2: The term "UV-100W" in the table means irradiation of ultraviolet light from a 100W mercury lamp.
*Stripped mercury was absorbed in a $KMnO_4/H_2SO_4$ solution and this absorbed mercury was deemed to be the amount of mercury recovered. The recovery was determined as a ratio in % of the amount of mercury recovered to the amount of mercury present in the starting waste water.

TABLE 2

(Unit: ppm)

| Heavy Metals | Incinerator Waste Water | | Treated Filtrate | |
|---|---|---|---|---|
| | Example 1 | Example 2 | Example 1 | Example 2 |
| Hg | 10 | 0.005 or less | 2 | 0.005 or less |
| Cd | 3 | 0.01 or less | 1.5 | 0.01 |
| T—Cr | 8 | 0.1 or less | 3 | 0.05 |
| Pb | 13 | 0.1 or less | 6.3 | 0.1 |
| Soluble Mn | 13 | 0.3 | 10 | 0.7 |
| Zn | 86 | 0.5 | 52 | 0.5 |
| Soluble Fe | 12 | 1 | 2.6 | 1.2 |
| Cu | 5 | 1.1 | 3 | 0.5 |

EXAMPLE 4

70,000 $Nm^3$/hr of waste gases (dry gases) from a municipal refuse incinerator having an incineration capacity of 300 Tons/day was passed into a wet washer or scrubber in which 70,000 kg/hr of a cleaning liquid was circulated and was adjusted in pH to about 7 by the use of a 24% caustic soda aqueous solution, and the waste gases were then washed. As a result of the washing, hydrogen chloride in the waste gases was reduced from 1,000 ppm to 10 ppm. The greater part of the cleaning liquid was circulated while withdrawing part thereof.

The salt concentration in the used cleaning liquid was 18% and the amount of used liquid withdrawn was 1,005 kg/hr. Aside from the used cleaning water obtained by the washing, 50 kg/hr of waste water from ashpit, 100 kg/hr of waste water obtained by washing of a boiler, and 200 kg/hr of waste water obtained by regeneration of an ion-exchange resin were incorporated, and, thus, the used cleaning liquid so withdrawn and the waste water amounting to 1,355 kg/hr in total was discharged as an incinerator waste water. In the incinerator waste water, there was contained 8.9 mg/l of mercury. The incinerator waste water was passed into a continuous regulating vessel, incorporated with ferrous sulfate heptahydrate at a rate of 35 kg/hr, adjusted in pH to 10 by the use of a 24% caustic soda aqueous solution and stayed for about 1 hour while keeping at 70° C. under agitation. Thereafter, the treated incinerator waste water was introduced into a reaction vessel into which air from a blower was blown at a rate of 41 $Nm^3$/hr. The outlet air contained saturated water vapor at 70° C. and 11.5 g/hr of metallic mercury in vapor form. This air was cooled to 10° C. by means of a condenser to recover liquid metallic mercury at a rate of 11.2 g/hr. The recovery was thus 93%. The mercury remaining in the gas phase was subsequently collected by adsorption on a commercially available gaseous mercury adsorbent resin. As a result, the mercury content at the outlet was found to be 0.5 mg/hr.

On the other hand, the incinerator waste water from which the mercury had been removed contained various harmful heavy metals other than mercury. The waste water was incorporated with sodium nitrate at a rate of 1 kg/hr, after which air was blown into the waste water while keeping the pH at 10 and the temperature at 70° C. therein thereby producing spinel compounds. The thus produced compounds were separated by filtration. As particularly shown in Table 3 below, the heavy metals in the incinerator waste water were reduced in amount as in the column "treated filtrate". The concentrations of the residual heavy metals in the filtrate were found to meet legal requirements in Japan.

TABLE 3

(Unit: ppm)

| Heavy Metals | Incinerator Waste Water | Treated Filtrate |
|---|---|---|
| Hg | 8.9 | 0.005 or less |
| Cd | 6 | 0.01 or less |
| T—Cr | 20 | 2 or less |
| $Cr^{6+}$ | 1 | 0.05 or less |
| Pb | 25 | 0.1 or less |
| As | 1 | 0.05 or less |
| Soluble Mn | 5 | 1 |
| Zn | 55 | 3 |
| Soluble Fe | 30 | 2 |
| Cu | 5 | 1 |

EXAMPLE 5

70,000 $Nm^3$/hr of waste gases (dry gases) from a municipal refuse incinerator having an incineration capacity of 300 Tons/day was passed into a wet washer, in which 70,000 kg/hr of a cleaning liquid was circulated and adjusted in pH to about 7 by the use of a 24% caustic soda aqueous solution, and then washed therein. As a result of the washing, hydrogen chloride in the waste gases was reduced from 1,000 ppm to 10 ppm. The greater part of the cleaning liquid was circulated while withdrawing part thereof.

The salt concentration in the used cleaning liquid was 18% and the amount of the liquid withdrawn was 1,005 kg/hr. Aside from the waste water obtained by the washing, 50 kg/hr of waste water from ashpit, 100 kg/hr of waste water obtained by washing of a boiler, and 200 kg/hr of waste water obtained by regeneration of an ion-exchange resin were incorporated and thus the waste water amounting to 1,355 kg/hr in total, was discharged as an incinerator waste water. In the incinerator waste water, there were contained mercury and other heavy metals in respective amounts as shown in Table 4. To the incinerator waste water was added 1,220 g/hr of hydrazine hydrochloride while blowing air thereinto for reaction under conditions of a pH of 11 and a temperature of 90° C. Subsequently, ferrous sulfate was added at a rate of 35 kg/hr, followed by adjustment of pH to 10 using a 24% caustic soda aqueous solution and treatment for about 1 hour while keeping the temperature at 70° C. under agitation. Thereafter, the incinerator waste water was introduced into a reaction vessel, into which was blown air from a blower at a rate of 41 Nm³/hr. The outlet air contained saturated water vapor at 70° C. and 14.0 g/hr of metallic mercury in vapor form. This air was cooled to 10° C. by means of a condenser to recover liquid metallic mercury at a rate of 13.75 g/hr. The recovery was thus 97%. The mercury remaining in the gas phase was subsequently collected by adsorption on a commercially available mercury vapor adsorbent resin. As a result, the mercury content at the outlet was found to be 0.5 mg/hr. The filtrate obtained by the filtration of the treated waste water containing spinel compounds formed by the addition of ferrous sulfate, contained the other various heavy metals in respective amounts as shown in Table 4.

TABLE 4
(Unit: ppm)

| Heavy Metals | Incinerator Waste Water | Treated Filtrate |
|---|---|---|
| Hg | 10.5 | 0.005 or less |
| Cd | 2 | 0.01 |
| T—Cr | 5 | 0.05 |
| Pb | 10 | 0.1 |
| Soluble Mn | 6 | 0.5 |
| Zn | 48 | 1 |
| Soluble Fe | 20 | 2 |
| Cu | 4 | 0.5 |

EXAMPLE 6

The procedure of Example 5 was followed except that 1,220 g of hydrazine hydrochloride were added in three equal portions one by one, whereas 1,220 g/hr of hydrazine hydrochloride were added at one time to 1,355 kg/hr of the incinerator waste water in Example 5. In the former case, a remarkably less amount of 790 g/hr of hydrazine hydrochloride was required to obtain the same mercury removal effect as in Example 5.

EXAMPLE 7

To 1,355 kg/hr of an incinerator waste water of the same type as used in Example 5 were added hydrazine hydrochloride and ferrous sulfate heptahydrate at rates of 1,220 g/hr and 35 kg/hr, respectively. Then, in the same manner as in Example 1, the resulting mixture was adjusted in pH to 10 using the same caustic soda aqueous solution and treated for about 1 hour while keeping at a temperature of 70° C. under agitation. Thereafter, it was introduced into a reaction vessel, into which air from a blower was blown at a rate of 40 Nm³/hr. The outlet air at about 70° C. which contained metallic mercury in vapor form and saturated water vapor, was cooled down to 10° C. by means of a condenser to obtain 13.82 g/hr of liquid metallic mercury. The recovery was 97.5%.

EXAMPLE 8

To 1,355 kg/hr of an incinerator waste water of the same type as used in Example 5 was added potassium permanganate as an oxidizing agent at a rate of 600 g/hr. At this time, the pH of the waste water was found to be 3. Thereafter, an excess of sodium sulfite was added to the resulting mixture, followed by agitating for reduction. To the mixture was further added 35 kg/hr of ferrous sulfate heptahydrate, followed by adjusting its pH to 10 using the same caustic soda aqueous solution and staying for about 1 hour while keeping at a temperature of 70° C. under agitation in the same manner as in Example 1. The mixture was introduced into a reaction vessel, into which air from a blower was blown at a rate of 41 Nm³/hr. The resulting outlet air at about 70° C. which contained metallic mercury vapor and saturated water vapor was cooled down to 10° C. by means of a condenser to recover 13.61 g/hr of liquid metallic mercury. The recovery was 96%.

EXAMPLES 9-15

Incinerator waste waters at various districts were sampled each in an amount of 1 liter, to which were added different types of reducing agents or a combination of oxidizing and reducing agents. To each waste water was further added 22 g of ferrous sulfate heptahydrate to form spinel compounds at 70° C. and a pH of 10-11. Thereafter, air was blown into each waste water at a rate of 1 /l min. at the time of addition of each of reducing agents and ferrous sulfate to effect the volatilization of mercury and the formation of spinel compounds. The mercury so stripped was collected with use of a sulfuric acid-potassium permanganate and quantitatively determined. The results are as shown in Table 5.

TABLE 5

| Ex. No. | Conc. of Salt in Waste Water wt % | Kind of Waste Water | Content of Mercury mg/l | Oxidizing Agent Kind | Oxidizing Agent Amount mg/l | Reducing Agent Kind | Reducing Agent Amount mg/l | Recovery* of Mercury % |
|---|---|---|---|---|---|---|---|---|
| 9 | 10 | A | 2 | — | — | $Na_2S_2O_4$ | 860 | 96.0 |
| 10 | 15 | B | 5 | — | — | $NaBH_4$ | 5 | 98.0 |
| 11 | 13 | C | 8 | NaClO | 350 | hydrazine | 600 | 99.3 |
| 12 | 16 | D | 15 | $H_2O_2$ | 200 | hydroxylamine hydrochloride | 1200 | 98.0 |
| 13 | 10 | E | 3 | $O_3$ | 100 | hydrazine | 200 | 99.0 |
| 14 | 12 | F | 7 | $K_2S_2O_8$ | 500 | Zn powder | 200 | 96.5 |
| 15 | 15 | G** | 15 | NaClO UV | 50 100W | hydrazine | 100 | 99.7 |

*Stripped mercury was absorbed in a $KMnO_4/H_2SO_4$ solution and this absorbed mercury was deemed as the amount of mercury recovered. The recovery was determined as a ratio in % of the amount of mercury recovered to the amount of mercury present in the starting waste water.
**In Example 15, NaClO was added as an oxidizing agent and ultraviolet light from a 100W high pressure mercury lamp was irradiated.

In Example 9, the starting waste water to be treated contained heavy metals as shown in Table 6. These heavy metals were converted to spinel compounds during reaction with the $FeSO_4$ while the mercury compounds were reduced and volatilized. The thus treated waste water was filtered to remove the spinel compounds therefrom thereby to obtain a filtrate which was also freed of the other heavy metals as indicated in Table 6.

TABLE 6

| Heavy Metals | Incinerator Waste Water | Treated Filtrate |
|---|---|---|
| | | (Unit: ppm) |
| Hg | 2 | 0.005 or less |
| Cd | 8 | 0.01 |
| T—Cr | 12 | 0.1 |
| Pd | 10 | 0.1 |
| Soluble Mn | 10 | 1 |
| Zn | 57 | 0.3 |
| Soluble Fe | 15 | 1 |
| Cu | 8 | 0.5 |

EXAMPLE 16

The procedure of Example 9 was followed except a certain amount of $Na_2S_2O_4$ was added at one time, to obtain the same effect as in Example 9, whereas 860 mg/l of $Na_2S_2O_4$ were continuously added while blowing air into the waste water in Example 9. The certain amount required was only 860 mg/l.

EXAMPLE 17

The concentrations of the residual heavy metals in the treated filtrate obtained in Example 4 are just as shown in Table 3. In order to further remove and recover all the mercury from the filtrate indicated in Table 3, the filtrate was treated by adding 1160 g/hr of sodium dithionite as a reducing agent and blowing air from a blower at a rate of 50 $Nm^3/hr$ while keeping the pH at 11 and the temperature at 70° C. As a result, the content of mercury in the filtrate so treated could be reduced to 0.002 ppm. The outlet air was cooled along with the mercury-containing air obtained in said treatment, thereby separating and recovering the mercury therefrom.

EXAMPLE 18

In order to further remove and recover the mercury from the treated filtrate of Example 4 indicated in Table 3, the filtrate was adjusted to have a pH of 11 and a temperature of 70° C., into which air was blown from a blower at a rate of 50 $Nm^3/hr$ while adding hydrazine dihydrochloride at a rate of 230 g/hr. As a result, the content of mercury in the filtrate so treated was reduced to 0.0005 ppm.

EXAMPLE 19

The procedure of Example 18 was followed except that 230 g of hydrazine hydrochloride were added in three equal portions one by one, whereas 230 g/hr of hydrazine hydrochloride were added at one time to the incinerator waste water in Example 18. In the former case, a remarkably less amount of 177 g/hr of hydrazine hydrochloride was required to obtain the same mercury removal effect as in Example 18.

EXAMPLE 20

To the treated filtrate of Example 4 indicated in Table 3 was added sodium hypochlorite as an oxidizing agent at a rate of 500 g/hr, followed by adjusting to a pH of 10 and a temperature of 70° C. and agitating for reaction. Subsequently, sodium sulfite was added to the filtrate and an oxidation-reduction potential was adjusted to ±0. Air was blown into the filtrate at a rate of 50 $Nm^3/hr$ while further adding hydroxylamine hydrochloride at a rate of 680 g/hr. As a result, the mercury in the filtrate so treated could be reduced to 0.0004 ppm.

EXAMPLE 21

To 1355 kg/hr of the waste water discharged as the incinerator waste water in Example 4 was added ferric chloride hexahydrate at a rate of 300 mg/l, followed by adjusting in pH to 10 by means of 24% caustic soda solution and separating the resulting precipitate. The mercury content in the treated waste water was found to be 1.5 mg/l.

Thereafter, the general procedure of Example 20 was repeated except that 54% hydrous hydrazine was added to the treated water at a rate of 600 g/hr and that the pH was adjusted to 10. The mercury content in the treated solution was reduced to 0.001 ppm.

EXAMPLE 22

2600 kg/hr of a used cleaning liquid having a salt concentration of 7% was withdrawn from a washer for incinerator waste gases, the washer being similar to that of Example 4. This waste water contained 5.0 mg/l of mercury.

The waste water was incorporated with 25 mg/l of sodium sulfide for reaction, mixed with 600 mg/l of ferric chloride hexahydrate, adjusted in pH to 10 using caustic soda and filtered to collect the resulting precipitate. The content of mercury in the filtrate was found to be 0.02 mg/l.

The filtrate was adjusted in pH to 11 and in temperature to 70° C., into which air was blown from a blower at a rate of 100 $Nm^3/hr$ while adding hydrazine dihydrochloride at a rate of 230 g/hr. As a result, the content of mercury in the filtrate so treated could be reduced to 0.0005 ppm.

EXAMPLE 23

The filtrate of Example 21 containing 1.5 mg/l of mercury was sampled in a beaker in an amount of 1 liter and passed through a column packed with Sumi Chelate Q-10 (trademark of Sumitomo Chemical Co., Ltd.) at a SV of 5, with the result that the mercury content in the thus treated filtrate was reduced to 0.007 mg/l. Further, the resulting waste water was adjusted to a pH of 11 and a temperature of 70° C., into which air was blown at a rate of 1 l/min, followed by adding 265 mg of 54% hydrous hydrazine. The mercury content in the further treated waste water was reduced to 0.0001 ppm.

EXAMPLE 24

The waste water obtained in Example 23 and having a mercury content of 0.007 mg/l was adjusted in temperature to 65° C. and in pH to 10, to which was added 3 mg/; of sodium borohydride while blowing air at a rate of 1 l/min. As a result, the content of mercury in the waste water so treated was reduced to 0.0003 ppm.

EXAMPLE 25

One liter of the filtrate of Table 3 in Example 4 was incorporated with 60 mg of ozone ($O_3$) to effect an oxidizing reaction at 70° C. and a pH of 5 and then reacted with 120 mg of a 54% hydrazine hydrate at 70° C. and a pH of 10 while blowing 1 l/min. of air thereby to reduce the mercury content of the filtrate to 0.0001 mg/l.

EXAMPLE 26

One liter of the filtrate of Table 2 in Example 4 was incorporated with 300 mg of aluminum powder to react together at 70° C. and a pH of 2, blowing 1 l/min. of air at 70° C. and a pH of 10 into the thus reacted filtrate and then filtering the filtrate so treated to obtain a further filtrate having a mercury content of 0.001 mg/l.

EXAMPLE 27

The procedure of Example 25 was followed except that a certain amount of a 54% hydrazine hydrate was continuously added to obtain the same effect as in Example 25, whereas 120 mg of a 54% hydrazine hydrate was added at one time in Example 25. The certain amount was found to be as small as 102 mg.

EXAMPLE 28

One liter of the filtrate of Table 3 in Example 4 was incorporated with 200 mg of $KMnO_4$ to react together at 70° C. and a pH of 10, thereafter adjusted in the oxidation-reduction potential to ±0 with use of $Na_2SO_3$ and filtered to obtain a further filtrate which was incorporated with 60 mg of a 54% hydrazine hydrate and then reacted together at 70° C. and a pH of 10 while blowing air at a flow rate of 1 l/min., thereby reducing the mercury content in the thus treated further filtrate to 0.0001 mg/l.

What is claimed is:

1. A process for the removal of mercury from muicipal incinerator waste water containing mercury and other heavy metals, comprising first adding ozone to the waste water, then adding hydrazine to obtain a reaction mixture, subjecting the reaction mixture to stripping treatment at a temperature of not lower than 15° C. in the presence of ferrous ion to obtain a gas mixture containing mercury vapor and cooling the gas mixture to separate the mercury therefrom simultaneously with rendering the residual waste water harmless.

2. A process according to claim 1, wherein the incinerator waste water is kept at a pH of at least 1.

3. A process according to claim 1, wherein said hydrazine is continuously added when the waste water is batchwise treated.

4. A process according to claim 1, wherein said hydrazine is added in portions when the waste water is continuously treated.

5. A process according to claim 1, wherein the ferrous ion is present in an amount of 0.01–2 mol/l.

6. A process according to claim 1, wherein the stripping treatment is effected at a temperature of not lower than 50° C.

7. A process according to claim 1, wherein the stripping is effected by blowing air.

8. A process according to claim 1, wherein the cooling is effected at a temperature of not higher than 10° C.

9. A process according to claim 1, wherein the stripped gas mixture is cooled directly with chilled water.

10. A process according to claim 1, wherein said hydrazine is added while blowing air.

11. A process according to claim 1, wherein the waste water obtained after the stripping treatment is admixed with a caustic alkali in the presence of 0.02 to 1 mol of $NO_3^-$ while keeping the pH in the range of 6.5 to 11.5 thereby producing spinel type crystalline compounds and separating these compounds from the waste water.

12. A process according to claim 11, wherein the admixing is effected while keeping at a temperature not lower than 50° C., to form spinel type crystalline compounds.

13. A process according to claim 11, wherein a filtrate obtained after separation of the spinel type crystal compounds is admixed with said hydrazine and then subjected to stripping treatment.

14. A process according to claim 13, wherein air is blown into the waste water simultaneously with addition of the hydrazine agent.

15. A process according to claim 11, wherein a filtrate obtained after separation of the spinel type crystal compounds is admixed first with ozone, then with hydrazine and then subjected to stripping treatment.

* * * * *